(12) United States Patent
Mosher (10) Patent No.: US 9,764,615 B2
(45) Date of Patent: Sep. 19, 2017

(54) AERODYNAMIC MECHANISM CONFIGURED TO SELECTIVELY GENERATE DOWNFORCE ONTO A VEHICLE

(71) Applicant: GM GLOBAL TECHNOLOGY OPERATIONS LLC, Detroit, MI (US)

(72) Inventor: Jeffrey A. Mosher, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 119 days.

(21) Appl. No.: 14/826,275

(22) Filed: Aug. 14, 2015

(65) Prior Publication Data

US 2017/0043644 A1    Feb. 16, 2017

(51) Int. Cl.
| | | |
|---|---|---|
| *B62D 7/22* | (2006.01) | |
| *B60G 99/00* | (2010.01) | |
| *B62D 21/11* | (2006.01) | |
| *B62D 35/00* | (2006.01) | |
| *B62D 35/02* | (2006.01) | |

(52) U.S. Cl.
CPC ............ *B60G 99/006* (2013.01); *B62D 21/11* (2013.01); *B62D 35/007* (2013.01); *B62D 35/02* (2013.01); *B60G 2202/12* (2013.01); *B60G 2300/27* (2013.01)

(58) Field of Classification Search
CPC .. B60G 21/05; B60G 2300/20; B62D 35/007; B62D 21/183; Y10S 180/903
USPC ................. 280/788; 296/180.1, 180.3, 181.5
See application file for complete search history.

(56) References Cited

U.S. PATENT DOCUMENTS

| | | | |
|---|---|---|---|
| 3,455,594 A * | 7/1969 | Mrlik ..................... | B60G 17/00 188/270 |
| 3,851,912 A | 12/1974 | Grosseau | |
| 4,386,801 A | 6/1983 | Chapman et al. | |
| 5,061,007 A * | 10/1991 | Simpson ................ | B60G 21/05 180/903 |
| 5,236,242 A * | 8/1993 | Seeman ............... | B62D 35/001 296/180.1 |
| 6,520,564 B1 * | 2/2003 | Liang ..................... | B62D 35/00 180/903 |
| 6,805,399 B1 * | 10/2004 | Brown ................... | B62D 37/02 296/180.1 |
| 7,052,074 B2 * | 5/2006 | Dringenberg ........ | B62D 35/007 296/180.5 |
| 7,201,432 B2 * | 4/2007 | Roth .................... | B62D 35/007 296/180.5 |

(Continued)

Primary Examiner — Toan To
(74) Attorney, Agent, or Firm — Quinn IP Law (57) ABSTRACT

A vehicle includes an aerodynamic mechanism for a vehicle including a body and a wheel. The aerodynamic mechanism includes a wing and a coupling assembly. The wing is configured to be arranged to intersect and airflow such that the airflow circulates about the wing and generates downforce. The coupling assembly is operatively connected to the wing and configured to be operatively connected to the body. The coupling assembly is configured to be selectively coupled to the wheel such that downforce generated by the wing is transmitted through the coupling assembly, directly to the wheel. The coupling assembly is configured to be selectively decoupled from the wheel such that downforce generated by the wing is transmitted through the coupling assembly, directly to the body.

19 Claims, 6 Drawing Sheets

(56) References Cited

U.S. PATENT DOCUMENTS

| | | | |
|---|---|---|---|
| 7,226,117 B2* | 6/2007 | Preiss | B62D 35/007 |
| | | | 296/180.1 |
| 7,717,494 B2 | 5/2010 | Nagahama | |
| 7,770,962 B1* | 8/2010 | Maxwell | B62D 35/007 |
| | | | 296/180.5 |
| 8,731,781 B2 | 5/2014 | Prentice | |
| 8,960,770 B2* | 2/2015 | De Luca | B62D 35/007 |
| | | | 296/180.5 |
| 9,381,957 B1* | 7/2016 | Auden | B62D 35/007 |
| 9,403,564 B1* | 8/2016 | Al-Huwaider | B62D 35/007 |
| 2008/0116717 A1* | 5/2008 | Honeycutt | B62D 37/02 |
| | | | 296/180.5 |

* cited by examiner

AERODYNAMIC MECHANISM CONFIGURED TO SELECTIVELY GENERATE DOWNFORCE ONTO A VEHICLE

TECHNICAL FIELD

The present disclosure is related to an aerodynamic mechanism configured to selectively generate downforce onto a vehicle.

BACKGROUND

Vehicles may include a suspension system. Roads may have bumps or holes and when a vehicle travels over the bump or hole, the suspension system dampens movement of a sprung mass of the vehicle, thus providing a smoother ride. During operation of a vehicle, such as a sports car, at certain speeds, a spoiler may be provided to provide downforce onto the vehicle to affect performance of the vehicle.

SUMMARY

One possible aspect of the disclosure provides an aerodynamic mechanism for a vehicle including a body and a wheel. The aerodynamic mechanism includes a wing and a coupling assembly. The wing is configured to be arranged to intersect and airflow such that the airflow circulates about the wing and generates downforce. The coupling assembly is operatively connected to the wing and configured to be operatively connected to the body. The coupling assembly is configured to be selectively coupled to the wheel such that downforce generated by the wing is transmitted through the coupling assembly, directly to the wheel. The coupling assembly is configured to be selectively decoupled from the wheel such that downforce generated by the wing is transmitted through the coupling assembly, directly to the body.

In another aspect of the disclosure, a vehicle is configured for driving on a ground surface. The vehicle includes a body, a first suspension system, a second suspension system, and an aerodynamic mechanism. The body extends along a longitudinal axis, between a forward end and a rearward end, and extends along a lateral axis, generally perpendicular to the longitudinal axis, between a first lateral side and a second lateral side. The first suspension system is operatively connected to the body, proximate the first lateral side and the second suspension system is operatively connected to the body, proximate the second lateral side. The first and second suspension systems each include a sprung portion, an unsprung portion, and a spring. The sprung portion is operatively connected to the body. The spring biasingly interconnects the sprung portion and the unsprung portion to allow relative motion between the body and the unsprung portion.

The aerodynamic mechanism is operatively connected to the first and second suspension systems and the body. The aerodynamic mechanism includes a wing and a coupling assembly. The wing is configured to be subjected to airflow, such that airflow about the wing generates downforce. The coupling assembly is operatively connected to the wing and the body. The coupling assembly is configured to be selectively coupled to the unsprung portion of the respective first and second suspension systems in a coupled configuration such that the downforce is selectively transmitted through the coupling assembly to the unsprung portion of each of the first and second suspension systems. The coupling assembly is configured to be selectively decoupled from the unsprung portion of the first and second suspension systems in a decoupled configuration such that the downforce generated by the wing is not transmitted through the coupling assembly to the unsprung portion of each of the first and second suspension systems. Therefore, the coupling assembly may be configured such that downforce is selectively transmitted to the first and second wheels, while downforce is not transmitted to the body. The coupling assembly is configured such that aerodynamic forces on the wing are transmitted to the suspension system in a manner that does not cause relative motion between the body and wheel.

In yet another aspect of the disclosure, the coupling assembly may be configured to selectively pivot the wing, relative to the body, when the wing is in an extended position to vary drag generated by the wing.

In an additional aspect of the disclosure, the wing may be configured to be selectively moved to the retracted position and decoupled from the respective wheels, such that aerodynamic forces are not transmitted from the wing to the suspension system.

The above features and advantages and other features and advantages of the present teachings are readily apparent from the following detailed description of the best modes for carrying out the present teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
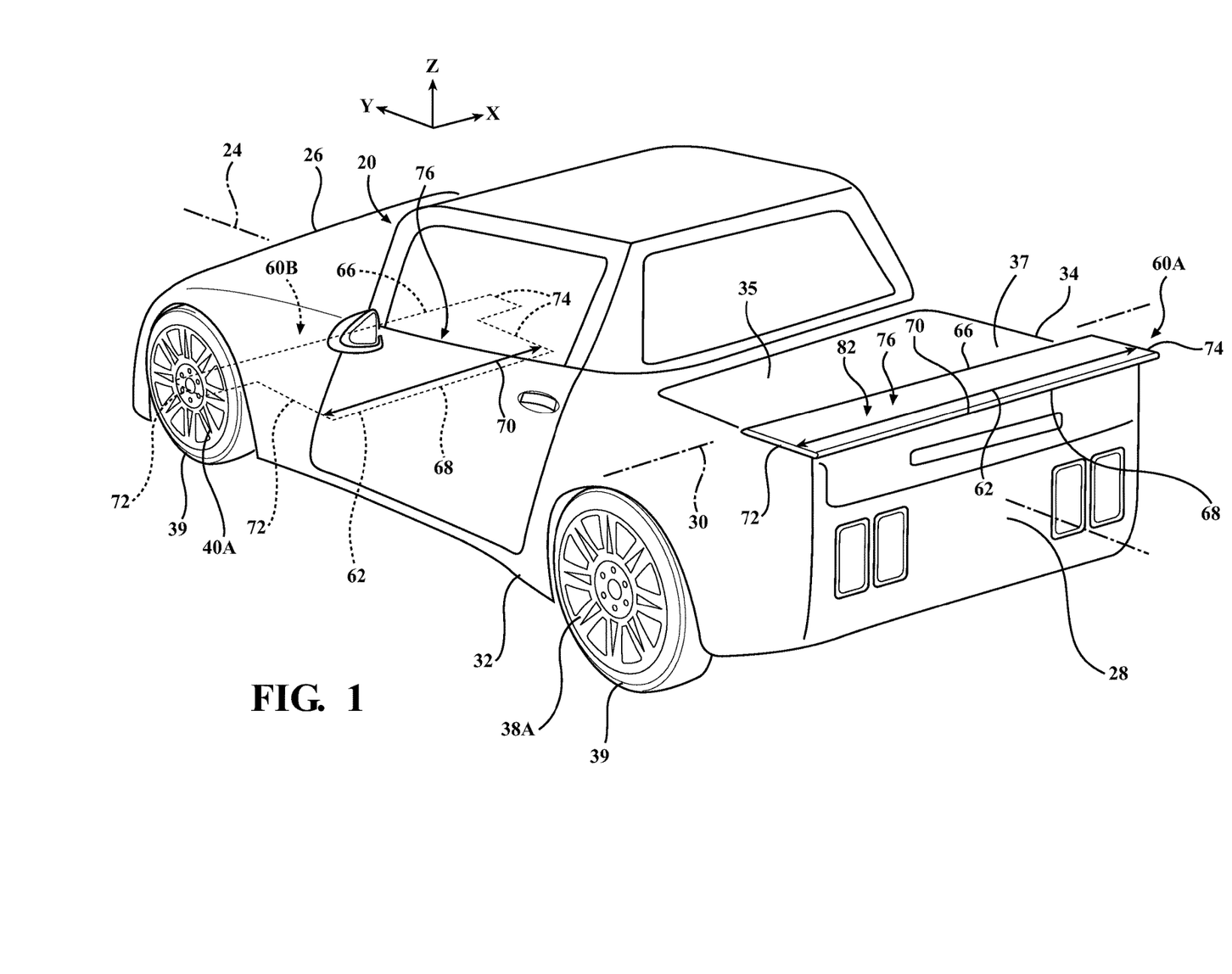
FIG. 1 is a schematic left rear perspective view of a vehicle including a front and a rear aerodynamic mechanism.

Referring to the Figures, wherein like numerals indicate like parts throughout the several views, a vehicle is generally shown at 20. Referring to FIG. 1, the vehicle 20 includes a body 22 extending along a longitudinal axis 24, i.e., in a Y direction, between a forward end 26 and a rearward end 28. The body 22 extends along a lateral axis 30, i.e., in an X direction, generally perpendicular to the longitudinal axis 24, between a first lateral side 32 and a second lateral side 34. The body 22 includes a body panel 35 extending along the longitudinal axis 24, opposite the ground surface G. The body panel 35 may be a deck lid 37, disposed proximate the rearward end 28 of the vehicle 20. The body 22 includes an underside 36 that generally extends longitudinally between the forward end 26 and the rearward end 28 and extends laterally between the first lateral side 32 and the second lateral side 34. The underside 36 is operatively disposed in spaced and facing relationship to the ground surface G.

The vehicle 20 includes a pair of rear wheels 38A, 38B and a pair of front wheels 40A, 40B. The pair of rear wheels 38A, 38B include a first (left) rear wheel 38A and a second (right) rear wheel 38B disposed in laterally spaced relationship to one another. The front wheels 40A, 40B include a first (left) front wheel 40A and a second (right) front wheel 40B disposed in laterally spaced relationship to one another. As such, the first front and rear wheels 38A, 40A are disposed proximate the first (left) lateral side 32 and the second front and rear wheels 38B, 40B are disposed proximate the second (right) lateral side 34 of the body 22. A tire 39 may radially surround each wheel 38A, 38B, 40A, 40B. The tire 39 is configured to provide traction or grip between the vehicle 20 and a surface of the ground surface G as the vehicle 20 operates.

With reference to FIGS. 2-5, each wheel 38A, 38B, 40A, 40B is operatively connected to the body 22 via a respective suspension system 42A-D. More specifically, a first front suspension system 42A operatively interconnects the first front wheel 40A and the body 22, a second front suspension system 42B operatively interconnects the second front wheel 40B and the body 22, a first rear suspension system 42C operatively interconnects the first rear wheel 38A and the body 22, and a second rear suspension system 42D operatively interconnects the second rear wheel 38B and the body 22. Each suspension system 42A-D is configured to articulate so as to allow relative motion between the body 22 and the respective wheel 38A, 38B, 40A, 40B. More specifically, each suspension system 42A-D includes a sprung portion 44 and an unsprung portion 46. The unsprung portion 46 is connected to the respective wheel 38A, 38B, 40A, 40B and the sprung portion 44 interconnects the body 22 and the respective wheel 38A, 38B, 38C, 38D. The sprung portion 44 includes a spring 48, or other type of biasing device, that operatively interconnects the sprung portion 44 and the unsprung portion 46 to continuously bias the body 22 relative to the unsprung portion 46, while allowing relative motion between the body 22 and the unsprung portion 46 and/or the respective wheel 38A, 38B, 40A, 40B, as known to those skilled in the art. The unsprung portion 46 of the suspension system 42A-D may include components of the suspension system 42A-D that are not supported by the spring 48 and move with the respective wheel 38A, 38B, 40A, 40B, e.g., steering knuckle 50, lower control arm 52, wheel 47, tire 39, brake rotors 54 or drums, other brake components 56, and the like. Likewise, the sprung portion 44 of the suspension moves with the body 22, relative to the respective wheel 38A, 38B, 40A, 40B. Therefore, the sprung portion 44 of the suspension system 42A-D may support anything else within the vehicle 20 that is not directly supported by the unsprung portion 46, including, but not limited to, the body 22 of the vehicle 20.

With reference to FIGS. 1-5, the vehicle 20 includes at least one aerodynamic mechanism 60A, 60B. The vehicle 20 includes two aerodynamic mechanisms, i.e., a front aerodynamic mechanism 60A and a rear aerodynamic mechanism 60B. Referring to FIGS. 2-5, the front aerodynamic mechanism 60A is pivotally connected to the body 22 and operatively connected to the unsprung portion 46 of each of the first and second front suspension systems 42A, 42B. Likewise, the rear aerodynamic mechanism 60B is pivotally connected to the body 22 and selectively operatively connected to the unsprung portion 46 of each of the first and second rear suspension systems 42C, 42D.

Figure 2:
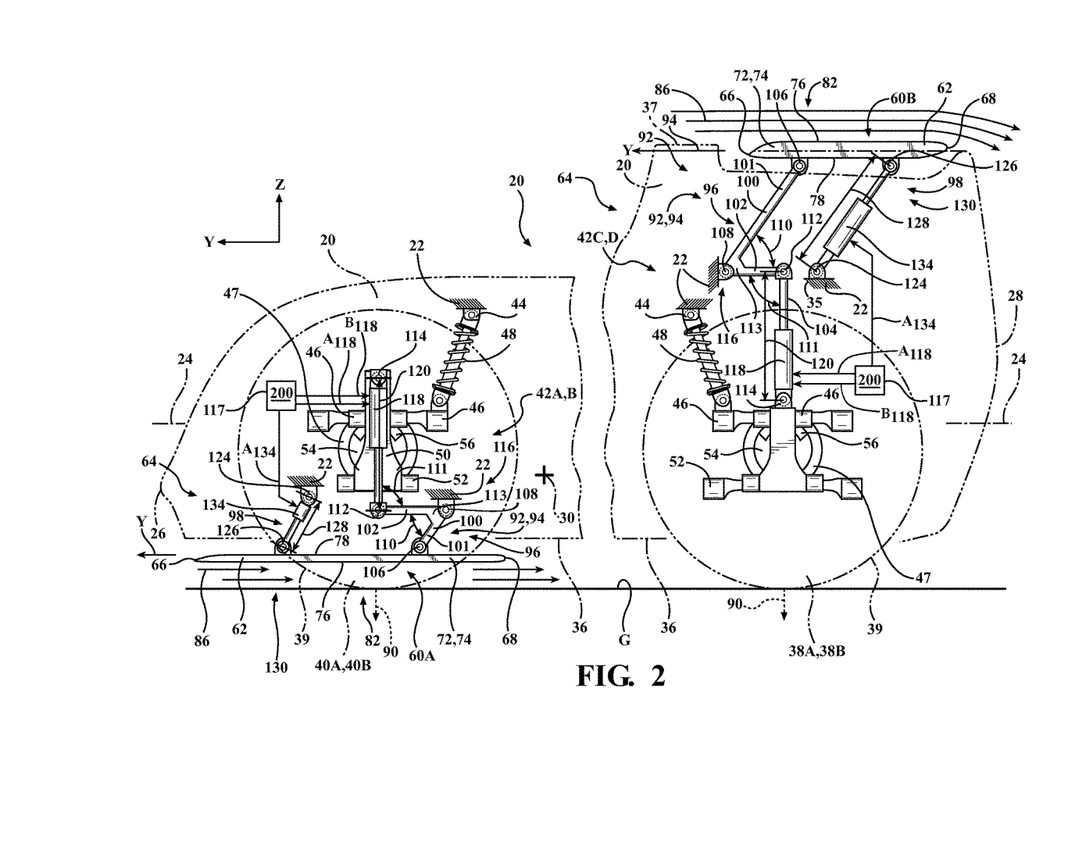
FIG. 2 is a schematic side view of the vehicle of FIG. 1, illustrating a wing of the front and rear aerodynamic mechanisms with a first actuator in a retracted position and a second actuator in a first position.
Figure 3:
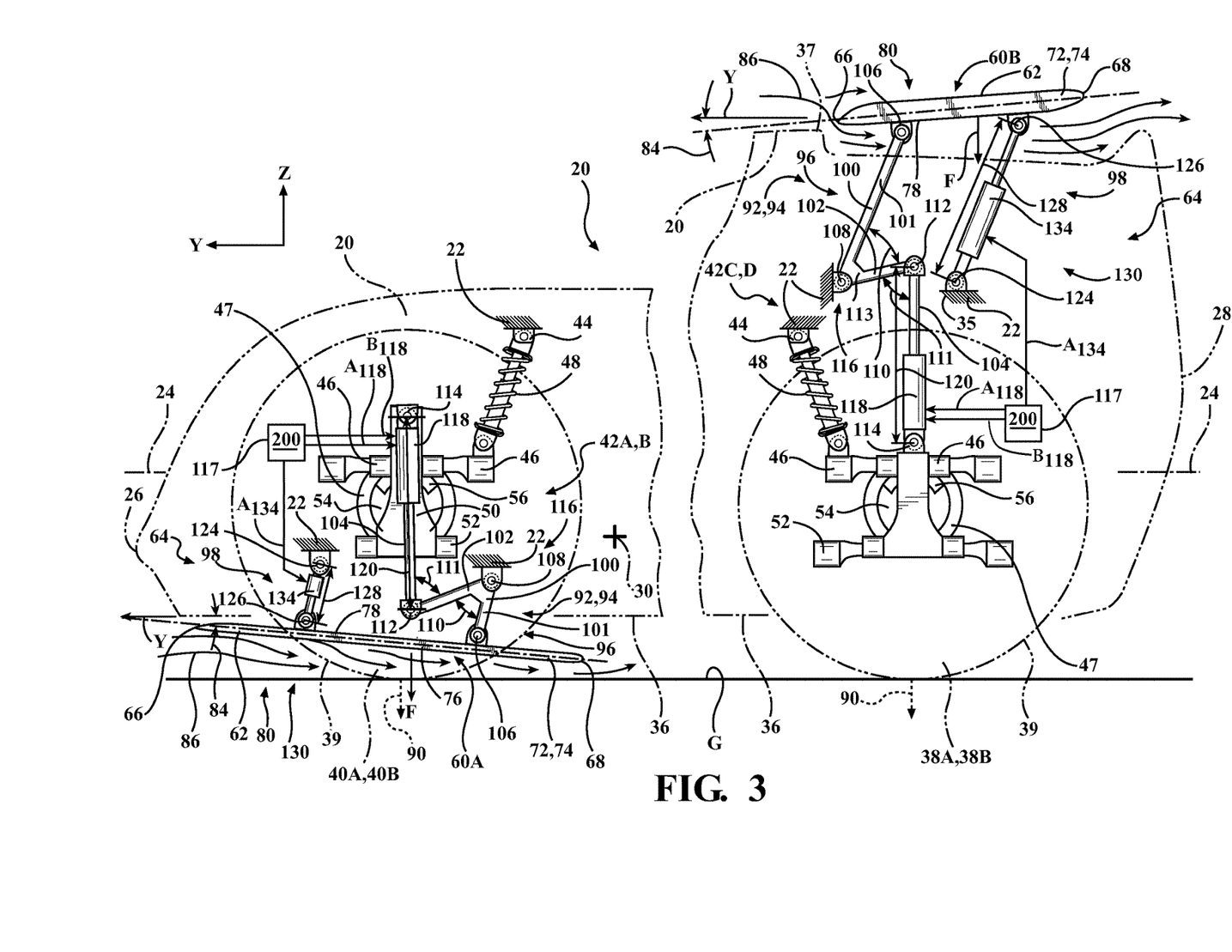
FIG. 3 is a schematic side view of the vehicle of FIG. 1, illustrating the wing of the front and rear aerodynamic mechanisms with the first actuator in an extended position and the second actuator in the first position.
Figure 4:
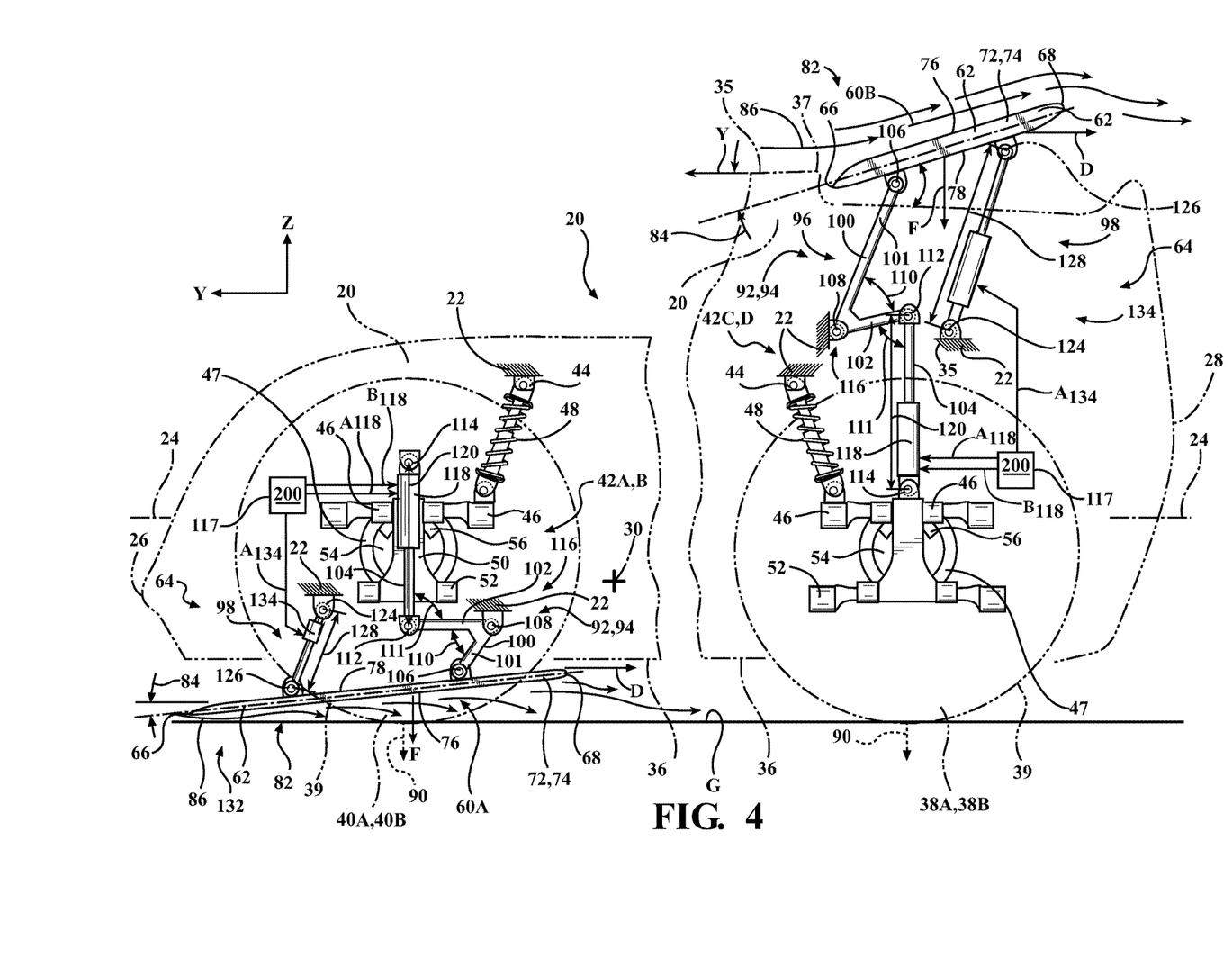
FIG. 4 is a schematic side view of the vehicle of FIG. 1, illustrating the wing of the front and rear aerodynamic mechanisms with the first actuator in the retracted position and the second actuator in a second position.
Figure 5:
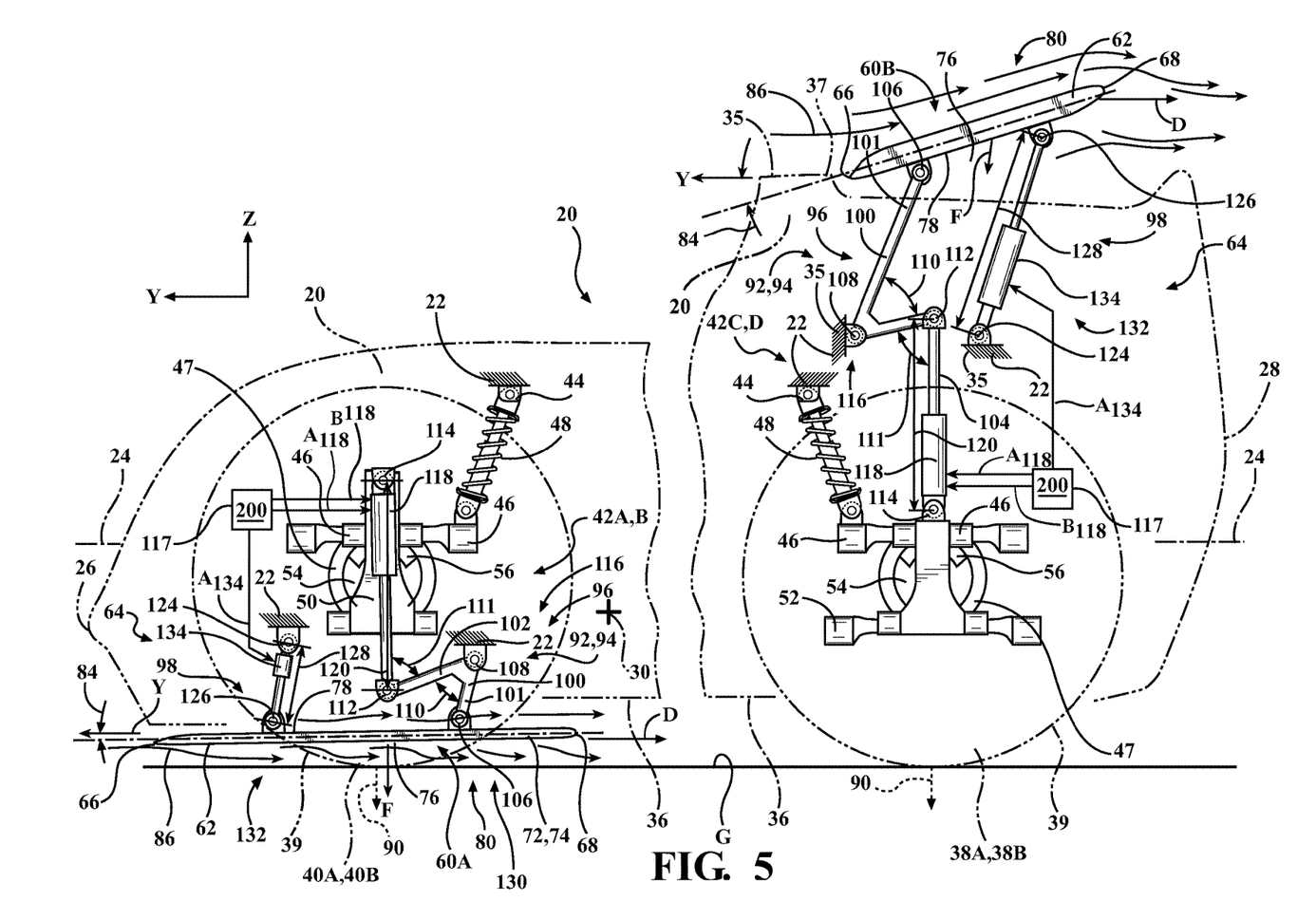
FIG. 5 is a schematic side view of the vehicle of FIG. 1, illustrating the wing of the front and rear aerodynamic mechanisms with the first actuator in the extended position and the second actuator in a second position.

The front and rear aerodynamic mechanisms 60A, 60B each include a wing 62, a coupling assembly 64, and a controller 117. The controller 117 is configured, i.e., equipped in hardware and programmed in software, to execute instructions embodying a method 200, an example of which is provided in FIG. 6 and described below with reference to FIGS. 1-5. Execution of the method 200 ultimately controls a position, i.e., an extended position 80 (as shown in FIGS. 3 and 5) or a retracted position 82 (as shown in FIGS. 2 and 4); an angle of incidence 84, i.e., a first position (as shown in FIGS. 2 and 3) and a second position (as shown in FIGS. 4 and 5) of the wing 62; and an engagement position, i.e., the wing 62 being coupled to, or decoupled from, the respective wheels 32A, 32B, 40A, 40B. In the extended position 80, the wing 62 is subjected to airflow 86 emanating from the forward end 26 of the vehicle 20 such that the airflow 86 about the wing 62 generates a downforce F that is transmitted to the tires 39, via the connection of the wing 62 to the respective unsprung portions 46, without compression of the springs 48 of the respective suspension systems 42A-D. Also, varying the angle of incidence 84 of the wing 62 between the first position 130 and the second position 132 increases the drag D generated by the wing 62 as the vehicle 20 operates. Therefore, the coupling assembly 64 is configured such that aerodynamic forces on the respective wing 62 are transmitted to the respective suspension systems 42A-D in a manner that does not cause relative motion between the body 22 and the respective wheels 32A, 32B, 40A, 40B. The aerodynamic forces include downforce F and drag D. Downforce F is a force component that is perpendicular to the direction of relative motion of the vehicle 20, i.e., in the longitudinal direction, toward the ground G. Drag D is a force component that is parallel to the direction of relative motion of the vehicle 20. When the wing 62 is in the retracted, first position 82, 130 the wing 62 may not generate downforce F and/or drag D, as illustrated in FIG. 2.

With continued reference to FIGS. 2-5, each wing 62 extends longitudinally between a leading edge 66 and a trailing edge 68 such that the leading edge 66 faces the forward end 26 of the body 22 and is disposed between the forward end 26 of the body 22 and the trailing edge 68 of the wing 62. The wing 62 laterally extends a span 70 between a first end 72 and a second end 74. The first end 72 is proximate the respective first front or rear suspension system 42A or 42C and the second end 74 is proximate the respective second front or rear suspension system 42B or 42D. The wing 62 also includes an outward surface 76 and an inward surface 78, opposing the outward surface 76. The inward surface 78 extends between the leading edge 66 and the trailing edge 68 and faces the vehicle 20 body 22. The outward surface 76 extends between the leading edge 66 and the trailing edge 68, opposite the inward surface 78, and faces away from the body 22.

Each coupling assembly 64 is configured to selectively rotate the respective wing 62 relative to the body 22 to vary drag D when the wing 62 is in the extended position 80, between the retracted position 82 and the extended position 80, and to selectively couple the wing 62 to, and decouple the wing 62 from, the unsprung portion 46. Likewise, the coupling assembly 64 is configured to move the wing 62 to the retracted position 82, the wing 62 moves toward the respective suspension systems 42A-D, such that the wing 62 does not generate drag D, i.e., the wing 62 does not intersect airflow 86. Each coupling assembly 64 includes, a first linkage mechanism 92 and a second linkage mechanism 94. The first linkage mechanism 92 is operatively disposed proximate the first end 72 of the wing 62 and the second linkage mechanism 94 is operatively disposed proximate the second end 74 of the wing 62, opposite the first end 72 of the wing 62.

The first and second linkage mechanisms 92, 94, described above, each include a primary linkage 96 and a secondary linkage 98. Each primary linkage 96 operatively connects the wing 62 to both the body 22 and the unsprung portion 46 of the respective first and second front and rear suspension systems 42A-D. The primary linkage 96 includes a first connector 100 and a second connector 104. The first connector 100 is pivotally connected to the wing 62 at the first joint 106. The first connector 100 includes a first arm 101 and a second arm 102. The first arm 101 and second arm 102 extend from a corner 113 in diverging relationship to one another. The corner 113 of the first connector 100 is pivotally attached to the body 22 at a second joint 108. The second arm 102 is pivotally attached to the second linkage mechanism 94 at a third joint 112. A first joint angle 110 is defined between the first arm 101 and the second arm 102. The second arm 102 is not pivotable, relative to the first arm 101. The first joint angle 110 may be an acute angle. The first joint 106 of the primary linkage 96 is pivotally connected to the body 22, at a pivot point 116.

The second connector 104 is pivotally connected to the second arm 102 at the third joint 112. The second connector 104 is attached to the unsprung portion 46 at a fourth joint 114. The third joint 112 may be a ball joint and the like. A second joint angle 111 may be defined between the second arm 102 and the second connector 104. The second joint angle 111 may vary, as will be described in more detail below.

The second connector 104 is operatively attached to the unsprung portion 46 of the respective suspension 42A-D at the fourth joint 114. The second connector 104 may include a first actuator 118, such as a linear actuator and the like, that is configured to selectively vary a primary distance 120, defined between the third joint 112 and the fourth joint 114 and to selectively couple/decouple the wing 64 and the body 22 relative to the unsprung portion 46 of the respective suspension 42A-D. Therefore, actuation of the first actuator 118 may vary the primary distance 120 defined between the third joint 112 and the fourth joint 114. As the primary distance 120 is varied, the third joint 112 moves relative to the fourth joint 114. However, since the position of the third joint 112 relative to the first joint 106 and the second joint 108 is fixed, movement of the third joint 114 causes the first arm 101 and the second arm 102 to rotate about the same pivot point 116, relative the body 22. Such rotation causes a corresponding movement of the wing 62, via translation of the first joint 106, relative to the body 22. As such, varying the primary distance 120 causes the wing 62 to move between the extended position 80 (as shown in FIGS. 3 and 5) and the retracted position 82 (as shown in FIGS. 2 and 4).

Referring again to FIGS. 3 and 5, during operation of the vehicle 20, and with the wing 62 in the extended position 80, as the first actuator 118 is actuated, the primary distance 120 is decreased as the third joint 112 is moved toward the fourth joint 114. Movement of the third joint 112 toward the fourth joint 114 during actuation of a second actuator 134 causes the first and second connectors 102, 104 to pivot about the pivot point 116, while translating the first joint 106, relative to the body 22. Translation of the first joint 106 causes the wing 62 to move from the extended position 80 to the retracted position 82, as shown in FIGS. 2 and 4, due to the pivotal connections of the first connector 100 to the wing 62 at the respective first joints 106 and to the body 22 at the respective second joints 108. Further, when the wing 62 is in the retracted position 82, the first actuator 118 may be configured to be actuated such that the second connector 104 is in a decoupled configuration, where the wing 62 and the body 22 are decoupled from the unsprung portion 76 of the respective suspension system 42A-D. As such, the decoupled configuration means that movement of the unsprung portion 76 does not cause a corresponding movement of the wing 62 or the body 22, and vice versa. Such decoupling will maintain the wing 62 in the retracted position 82, while being unaffected by articulation of the unsprung portion 46 of the respective suspension system 42A-D.

Conversely, as the primary distance 120 is increased, the wing 62 moves from the retracted position 82 (as shown in FIGS. 2 and 4) to the extended position 80 (as shown in FIGS. 3 and 5). It should also be appreciated that the actuation of the first actuator 118 may also change the angle of incidence 84 of the respective wing 62. Such changes in the angle of incidence 84 may be a function of placement of the joints 106, 108, 112, 114 the sizes and angles 110, 111 of the primary linkages 96, and the like.

The secondary linkages 98 extend between a body joint 124 and a stabilizing joint 126, disposed proximate the respective first and second end 72, 74 of the wing 62. The secondary linkages 98 are pivotally attached to the body 22 at the body joint 124 and are pivotally attached to the wing 62 at the stabilizing joint 126, proximate the respective first and second end 72, 74 of the wing 62. The body joint 124 is disposed in longitudinally spaced relationship to the second joint 108.

Each secondary linkage 98 may include a second actuator 134 to vary the angle of incidence 84 of the wing 62 to selectively dynamically move the wing 62 between low drag D (i.e., zero to low angle of incidence 84) and high drag D (i.e., high angle of incidence 84). The second actuator 134 may be a linear actuator operatively disposed along the secondary linkage 98 between the body joint 124 and the stabilizing joint 126. Actuation of the second actuator 134 may vary a secondary distance 128, defined between the body joint 124 and the stabilizing joint 126, by moving the secondary linkage 98 between a first position 130, illustrated in FIGS. 2 and 3, and a second position 132, illustrated in FIGS. 4 and 5. Therefore, actuation of the second actuator 134 may vary the secondary distance 128 defined between the body joint 124 and the stabilizing joint 126. As the secondary distance 128 is varied, the angle of incidence 84 of the wing 62 may change to effect the drag D.

The first and second linkage mechanisms 92, 94 of the coupling assembly 64 of each wing 62 provide a four bar mechanism or linkage that may constrain, or otherwise influence, an angle of incidence 84 of the wing 62. As such, actuation of the first and/or second actuators 118, 134 may vary the angle of incidence 84 of the respective wing 62.

With continued reference to FIGS. 2-5, the first actuator 118 may be activated in response to a first actuation input (arrow $A_{118}$) and/or a second actuation input (arrow $B_{118}$) and the second actuator 134 may be activated in response to a third actuation input (arrow $A_{134}$). The first actuation input (arrow $A_{118}$), the second actuation input (arrow $B_{118}$), and the third actuation input (arrow $A_{134}$) may be electrical signals received from the controller 117. The first and second actuators 118, 134 may be actuated in unison or independent of one another. The controller 117 may be operatively attached to the first and second actuators 118, 134 of the coupling assembly 64 for each of the rear and front aerodynamic mechanisms 60A, 60B. The controller 117 of FIGS. 2-5 may be embodied as a computer device, or multiple such devices, each having one or more processors and memory. The memory includes sufficient amounts of tangible, non-transitory memory, e.g., optical or magnetic read only memory (ROM), erasable electrically-programmable read only memory (EEPROM), flash memory, and the like, as well as transient memory such as random access memory (RAM). Although omitted for clarity, the controller 117 also includes a high-speed clock, analog-to-digital (A/D) circuitry, digital-to-analog (D/A) circuitry, any required input/output (I/O) circuitry and devices, and signal conditioning/buffering/filtering electronics.

Individual control algorithms resident in the controller 117 or readily accessible thereby, such as instructions embodying the method 200 of FIG. 1, may be stored in memory and automatically executed via the processor to provide the respective control functionality. Possible control actions resulting from execution of the method 200 are described in detail below.

Referring to FIG. 1-5, the rear aerodynamic mechanism 60B is positioned proximate a deck lid 37 or similar upper surface, proximate the rearward end 28 of the vehicle 20. As such, in the retracted position 82, shown in FIG. 2, the outward surface 76 of the wing 62 of the rear aerodynamic mechanism 60B is proximate or flush with the upper surface of the deck lid 37 such that the wing 62 is not subjected to airflow 86 emanating from the direction of the forward end 26 of the vehicle 20. Conversely, when the rear aerodynamic mechanism 60B is in the extended position 80, shown in FIGS. 3 and 5, and/or if there is an angle of incidence 84, shown in FIGS. 3-5, the wings 62 are each configured to be selectively subjected to various amounts of airflow 86 emanating from the direction of the forward end 26 of the vehicle 20 such that the airflow 86 about the wing 62 generates a downforce F. It should be appreciated that in the extended position 80, downforce F is transmitted to the ground surface G, through the tires 39, via the connection of the rear aerodynamic mechanism 60B to the unsprung portion 46 of the respective first and second rear suspension systems 42C, 42D. Also, downforce F may be affected by drag D generated as a function of the angle of incidence 84, as shown in FIGS. 3-5. Further, FIG. 2 illustrates that when the wing 62 is in the retracted position 82, there is no angle of incidence 84.

Referring again to FIGS. 1-5, the front aerodynamic mechanism 60A is positioned below the body 22 of the vehicle 20, at or proximate the forward end 26 of the vehicle 20. As such, in the retracted position 82, the front aerodynamic mechanism 60A is proximate or flush with the underside 36 of the vehicle 20, as shown in FIG. 2, such that the wing 62 is not subjected to airflow 86 emanating from the direction of the forward end 26 of the vehicle 20. Conversely, when the front aerodynamic mechanism 60A is in the extended position 80, shown in FIGS. 3 and 5, the wing 62 is configured to be subjected to airflow 86 emanating from the direction of the forward end 26 of the vehicle 20 such that the airflow 86 about the wing 62 generates a downforce F.

Downforce F in this embodiment may be generated, at least in part, from suction generated between the outward surface 76 of the wing 62 and the ground surface G during operation of the vehicle 20. It should be appreciated that in the extended position 80, downforce F is transmitted to the tires 39, via the connection of the front aerodynamic mechanism 60A to the unsprung portion 46 of the respective first and second front suspension systems 42A, 42B.

In the extended position 80, as described above, the wing 62 may also be operatively disposed at an angle of incidence 84. Increasing the angle of incidence 84 deflects the air flow 86 and causes downward pressure on the wing 62 to increase. This, in turn, increases the speed of the airflow 86 over the outward surface 76 of the wing 62, opposite the vehicle body 22. As the speed of the airflow 86 increases, pressure on the wing's 62 outward surface 76 is further increased. The downward pressure on the wing's 62 outward surface 76 and pressure reduction on the wing's 62 inward surface 78 combine to furnish downforce F.

As such, when each wing 62 is subjected to airflow 86, i.e., during operation of the vehicle 20, the airflow 86 is around the leading edge 66, across the outward surface 76 of the wing 62, to generate downforce F. Downforce F is a downward thrust (toward the ground surface G) that is created by the aerodynamic characteristics of the wing 62. Downforce F allows the vehicle 20 to travel at an increased speed, as the vehicle 20 turns a corner, by increasing a vertical force 90 on the corresponding tires 39, thus creating more grip between the tires 39 and the ground surface G.

As already described above, when each wing 62 is in the extended position 80, the respective wing 62 may be configured such that the angle of incidence 84 is selectively adjustable to vary downforce F, i.e., by varying the secondary distance 128 of the secondary linkages 98 and/or varying the primary distance 120 of the second connector 104. Further, the wing 62 of the rear aerodynamic mechanism 60B may be adjustable independent of the wing 62 of the front aerodynamic mechanism 60A. As such, each wing 62 may have a different angle of incidence 84. In one embodiment, the angle of incidence 84 may be adjustable between 1 degree and 20 degrees. More preferably, the angle of incidence 84 may be adjustable between 5 degrees and 10 degrees.

Likewise, when the wing 62 is in the retracted position 82, the wing 62 is configured to not generate a downforce F since the wing 62 is not subjected to airflow 86. Further, decoupling the wing 62 from the perspective suspension system 42A-D further ensures the wing 62 does not generate a downforce F, since the wing 62 will remain generally flush or proximate the respective body panel 34 or underside the vehicle 20.

During operation of the vehicle 20, the controller 117 may be configured to automatically move the wing 62 to a desired position, i.e., extended position 80 or retracted position 82, vary the angle of incidence 84 of the respective wing 62 relative to the ground surface G, and couple/decouple the wing 62 from the respective suspension systems 42A-D. As such, the controller 117 may determine operating conditions of the vehicle 20, including a speed of the vehicle 20. This type of automatic movement of the wing 62 may allow the vehicle 20 to selectively generate low drag D with a low downforce F during typical driving, i.e., the wing 62 decoupled and in the retracted position 82. However, when the vehicle 20 is turning, i.e., driving around curves or corners, at high rates of speed, the wing 62 may be moved to the extended position 80 to generate high downforce F with high drag D. The controller's 117 ability to automatically move the wing 62 to a desired position 80, 82 may be the result of a vehicle 20 operator selecting a track mode. Therefore, when the track mode is not selected by the operator, the wing 62 remains in the decoupled and retracted position 82, where the wing 62 provides little to no downforce F to the vehicle 20. When the wing 62 is in the extended position 80, the drag D may be selectively varied by the controller 117 by varying the angle of incidence 84 via actuation of the second actuators 134 and/or the first actuators 118 of the respective wing 62.

Alternatively, the controller 117 may be configured to move the wing 62 to the desired position, i.e., extended position 80 or retracted position 82, in response to the selection of a desired position by the operator of the vehicle 20. Therefore, the operator may select that the wing 62 should be in the extended position 80, so as to provide a high downforce F. As a result, the first actuator 118 is actuated to move the wing 62 to the extended position 80. Then, depending on whether a high drag D or a low drag D is desired, the second actuator 134 may be actuated to move the wing 62 to the desired angle of incidence 84. In one embodiment, the angle of incidence 84 may be a function of the position of the primary linkage 96 and secondary linkage 98 such that low drag D is generated when the second actuator 134 is in the first position 130, as illustrated in FIG. 3. Likewise, high drag D is generated when the second actuator 134 is in the second position 132, as illustrated in FIGS. 4 and 5, such that the secondary distance 128 is increased from when the second actuator 134 is in the first position 130.

Figure 6:
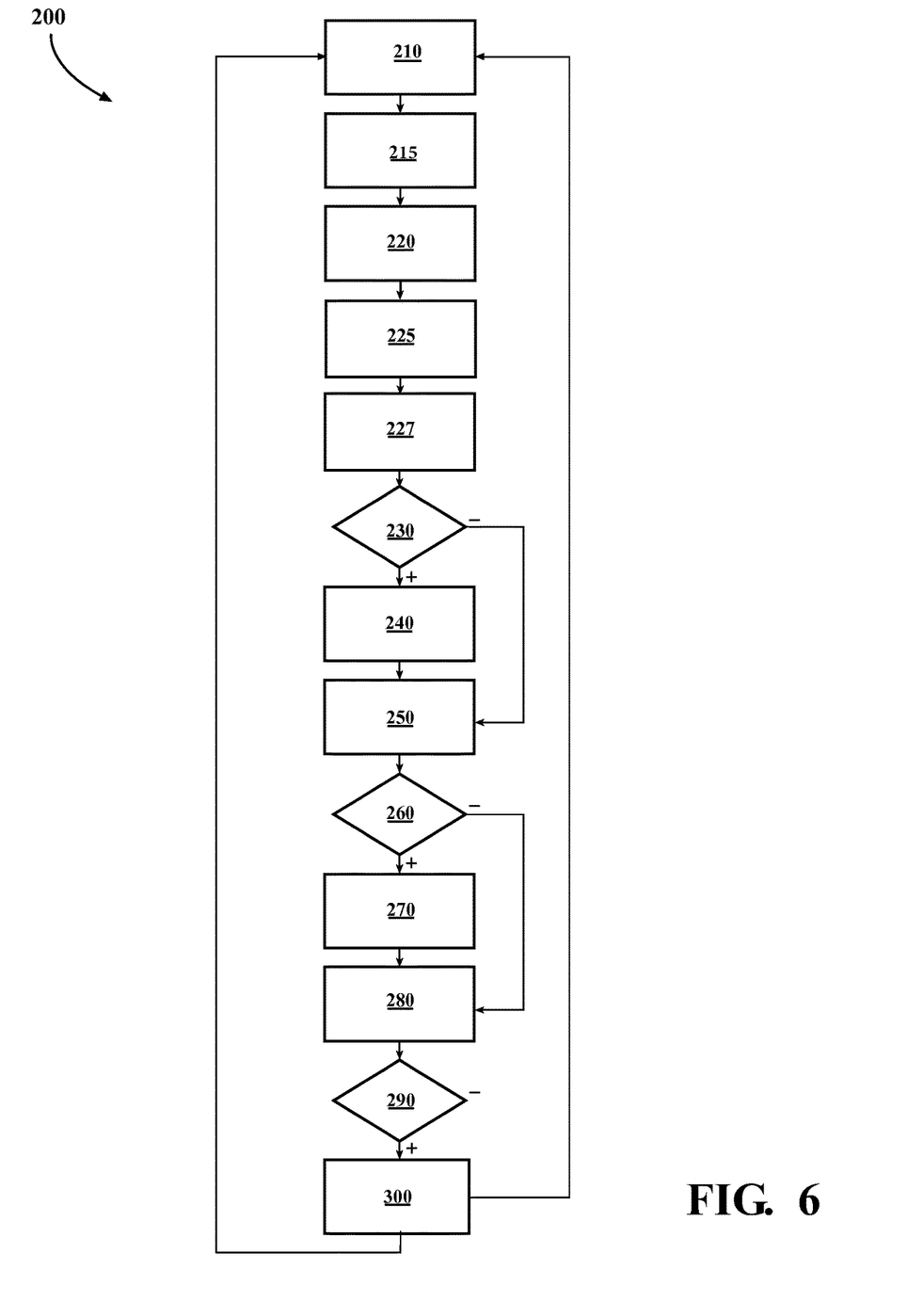
FIG. 6 is a flowchart showing an example method of controlling a position of the wing of at least one aerodynamic mechanism within the vehicle.

FIG. 6 illustrates an example embodiment of the method 200 of FIG. 1. The method 200 is suitable for individually controlling each wing 62 for the respective aerodynamic mechanism 60A, 60B of the vehicle 10 of FIG. 1.

Referring now to FIGS. 1 and 6, the method 200 begins with step 210 where a determination of at least one operating condition of the vehicle 20 is determined. By way of a non-limiting example, the operating condition may be, for example, that the vehicle 20 is operating in a forward direction (along a Y axis), a speed of the vehicle 20, an acceleration rate of the vehicle, and/or the like.

The method proceeds to step 215 where a determination is made by the controller 117 as to a required position 80, 82 of one of the wings 62 for the corresponding front or rear aerodynamic mechanism 60A, 60B. More specifically, the determination made by the controller 117 may determine that the wing 62 should be in the extended position 80 or the retracted position 82. The required position 80, 82 of the wing 62 may be a function of at least one operating condition of the vehicle 20.

Next, the method proceeds to step 220, where a required engagement configuration is made by the controller 117 as to whether the wing 62 for the corresponding aerodynamic mechanism 60A, 60B is required to be coupled to, or decoupled from, the corresponding suspension system 42A-D. The required engagement configuration may be a function of at least one operating condition of the vehicle 20.

The method then proceeds to step 225, where a required angle of incidence of the wing 62 is determined. The required angle of incidence may be a function of at least one operating condition of the vehicle 20.

Then, the method proceeds to step 227, where the actual position 80, 82 of the wing 62 is determined by the controller 117.

Next, the method proceeds to step 230, where the actual position 80, 82 of the respective wing 62 of the respective aerodynamic mechanism 60A, 60B is compared with the required position, via the controller 117. If the actual position of the respective wing 62 is different than the determined required position, the method proceeds to step 240. However, if the actual position of the respective wing 62 is the same as the determined required position, the method proceeds directly to step 250.

At step 240, the controller sends the first activation input (arrow $A_{118}$) to the first actuators 118 of the corresponding aerodynamic mechanism 60A, 60B to change the position 80, 82 of the wing to the required position 80, 82. The method then proceeds to step 250.

At step 250, the actual engagement configuration of the wing is determined by the controller 117. The method then proceeds to step 260.

At step 260, the determined actual engagement configuration is compared with the required engagement configuration, via the controller 117. If the actual engagement configuration of the wing 62 is different than the determined required engagement configuration, the method proceeds to step 270. However, if the actual position of the respective wing 62 is the same as the determined required position, the method proceeds directly to step 280.

At step 270, the controller sends the second activation input (arrow $B_{118}$) to the first actuators 118 of the corresponding aerodynamic mechanism 60A, 60B to change the position 80, 82 of the wing 62 to the required engagement configuration. The method then proceeds to step 280.

At step 280, the actual angle of incidence of the wing 62 is determined by the controller 117. The method then proceeds to step 280.

At step 290, the determined actual angle of incidence of the wing 62 is compared with the required angle of incidence of the wing 62, via the controller 117. If the actual angle of incidence of the wing 62 is different than the required angle of incidence, the method proceeds to step 300. However, if the required angle of incidence of the wing 62 is the same as the actual angle of incidence of the wing 62, the method returns to step 210.

At step 300, the controller 117 sends the third activation input (arrow $A_{134}$) to the second actuators 134 of the corresponding aerodynamic mechanism 60A, 60B to change the angle of incidence 84 to be equal to the required angle of incidence 84.

Upon returning to step 210, the method 200 may repeat steps 210 through 300 with respect to the same wing 62, the other wing 62, or the method 200 may run simultaneously with respect to the wings 64 for each of the aerodynamic mechanisms 60A, 60B.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An aerodynamic mechanism for a vehicle including a body and a wheel, the aerodynamic mechanism comprising:
   a wing arranged to intersect an airflow such that the airflow circulates about the wing and generates downforce; and a coupling assembly operatively connected between the wing and the body;

wherein the coupling assembly is pivotally connected to the wing and the coupling assembly is configured to be pivotally connected to each of the body and the wheel; and wherein the coupling assembly is configured to be selectively coupled to the wheel and decoupled from the wheel, such that when coupled to the wheel the downforce generated by the wing is applied through the coupling assembly, directly to the wheel, and when the coupling assembly is decoupled from the wheel, the downforce generated by the wing is transmitted through the coupling assembly, directly to the body.

2. The aerodynamic mechanism, as set forth in claim 1, wherein the coupling assembly is configured to be selectively moved, relative to the body, such that the wing moves between an extended position and a retracted position;

wherein when the wing is in the extended position and the coupling assembly is coupled to the wheel, downforce generated by the wing is transmitted through the coupling assembly, directly to the wheel, and wherein the body is configured to be displaced relative to the wing and the wheel; and wherein when the wing is in the retracted position and the coupling assembly is decoupled from the wheel, downforce generated by the wing is transmitted directly to the body, and wherein the wing and the body are configured to be displaced relative to the wheel.

3. The aerodynamic mechanism, as set forth in claim 1, wherein when the wing is in the extended position and coupled to the wheel, the wing is selectively pivotable, relative to the body, to vary an angle of incidence;

wherein airflow circulating about the wing generates downforce and drag;

wherein drag generated by the wing increases as a function of an increase of the angle of incidence; and wherein the coupling assembly is configured to be selectively coupled to the wheel such that the downforce and the drag generated by the wing are transmitted through the coupling assembly, directly to the wheel.

4. The aerodynamic mechanism, as set forth in claim 1, wherein the coupling assembly includes a primary linkage and a secondary linkage;

wherein the primary linkage is pivotally connected to the wing and the primary linkage is configured to be pivotally connected to each of the body and the wheel;

wherein the primary linkage the wing is configured to be selectively moved, relative to the body and the wheel, such that the wing moves between the extended position and the retracted position;

wherein the secondary linkage is pivotally connected to the wing and the secondary linkage is configured to be pivotally connected to the body; and wherein the secondary linkage is configured to be selectively moved, relative to the body, when the wing is in the extended position, to vary the angle of incidence.

5. The aerodynamic mechanism, as set forth in claim 4, wherein the primary linkage includes a first connector and a second connector;

wherein the first connector includes a first arm and a second arm, each extending from a corner in diverging relationship to one another such that a first joint angle is defined between the first arm and the second arm;

wherein the first arm is pivotally connected to the wing such that a first joint is defined therebetween;

wherein the corner is configured to be pivotally connected to the body at a second joint; and wherein the second connector is pivotally connected to the second arm at a third joint and the second connector is configured to be pivotally connected to the wheel at a fourth joint, such that a second joint angle is defined between the second arm and the second connector.

6. The aerodynamic mechanism, as set forth in claim 5, wherein the second connector includes a first actuator configured to be selectively actuated to vary a primary distance defined between the third joint and the fourth joint and to vary the second joint angle defined between the second arm and the second connector; and wherein the wing is configured to move between the retracted position and the extended position in response to varying the primary distance and the second joint angle.

7. The aerodynamic mechanism, as set forth in claim 5, wherein the second connector is configured to couple the wing to the wheel when the wing is in the extended position and the coupling assembly is coupled to the wheel, such that downforce is transmitted through the primary linkage, directly to the wheel, while the body is configured to be displaced relative to the wing and the wheel; and wherein the second connector is configured to decouple the wing from the unsprung portion of the first and second suspension system when the wing is in the retracted position and the coupling assembly is decoupled from the wheel, such that the downforce is transmitted through the primary linkage, directly to the body, while the wing and the body are configured to be displaced relative to the wheel.

8. The aerodynamic mechanism, as set forth in claim 7, wherein the secondary linkage includes:

a secondary coupling, pivotally attached to the wing at a stabilizing joint, and configured to be pivotally attached to the body at a body joint; and a second actuator, configured to be selectively actuated to vary a secondary distance defined between the body joint and the stabilizing joint to pivot the wing about at least one of the first joint and the second joint to vary the angle of incidence.

9. A vehicle configured for driving on a ground surface, the vehicle comprising:

a body extending along a longitudinal axis, between a forward end and a rearward end, and extending along a lateral axis, generally perpendicular to the longitudinal axis, between a first lateral side and a second lateral side;

a first suspension system operatively connected to the body, proximate the first lateral side;

a second suspension system operatively connected to the body, proximate the second lateral side;

wherein the first and second suspension systems each include:

a sprung portion operatively connected to the body;

an unsprung portion; and a spring, biasingly interconnecting the sprung portion and the unsprung portion to allow relative motion between the body and the unsprung portion; and an aerodynamic mechanism operatively connected to the first and second suspension systems and the body, wherein the aerodynamic mechanism includes:

a wing arranged to intersect an airflow, such that the airflow circulates about the wing and generates downforce; and a coupling assembly operatively connected to the wing and the body;

wherein the coupling assembly is configured to be selectively coupled to the unsprung portion of the respective first and second suspension systems, such that when coupled to the unsprung portions, the downforce generated by the wing is applied through the coupling assembly, directly to the unsprung portion of the respective first and second suspension systems, and when the coupling assembly is decoupled from the unsprung portion of the respective first and second suspension systems, the downforce generated by the wing is transmitted through the coupling assembly, directly to the body.

10. The vehicle, as set forth in claim 9, wherein the coupling assembly is configured to be selectively moved, relative to the body, such that the wing moves between an extended position and a retracted position;

wherein when the wing is in the extended position and the coupling assembly is coupled to the unsprung portion, downforce generated by the wing is transmitted through the coupling assembly, directly to the unsprung portion of each of the first and second suspension systems, and wherein the body is configured to be displaced relative to the wing and the unsprung portion of each of the first and second suspension systems; and wherein when the wing is in the retracted position and the coupling assembly is decoupled from the unsprung portion, downforce generated by the wing is transmitted through the coupling assembly, directly to the body, and wherein the wing and the body are configured to be displaced relative to the wheel.

11. The vehicle, as set forth in claim 10, wherein when the coupling assembly is in the extended position, the wing is selectively pivotable, relative to the body, to vary an angle of incidence between a first position and a second position; and wherein airflow circulating about the wing generates downforce and drag; and wherein the angle of incidence is greater in the second position than in the first position such that varying the angle of incidence of the wing increases drag generated by the wing.

12. The vehicle, as set forth in claim 11, further comprising a first wheel and a second wheel disposed in laterally spaced relationship to one another such that the first wheel is disposed proximate the first lateral side and the second wheel is disposed proximate the second lateral side;

wherein the first wheel is operatively attached to the unsprung portion of the first suspension system and the second wheel is operatively attached to the unsprung portion of the second suspension system.

13. The vehicle, as set forth in claim 11, wherein the wing longitudinally extends between a leading edge and a trailing edge, such that the leading edge is disposed in facing relationship to the forward end of the body and the trailing edge is disposed opposite the leading edge; and wherein the wing laterally extends between a first end and a second end, such that the first end is disposed proximate the first suspension system and the second end is disposed proximate the second suspension system; and wherein the coupling assembly includes:
a first linkage mechanism operatively disposed proximate the first end of the wing, wherein the first linkage mechanism operatively connects the wing to the body and is selectively coupled to the unsprung portion of the first suspension system; and a second linkage mechanism operatively disposed proximate the second end of the wing, wherein the second linkage mechanism operatively connects the wing to the body and is selectively coupled to the unsprung portion of the second suspension system.

14. The vehicle, as set forth in claim 13, wherein the first and second linkage mechanisms each include a primary linkage and a secondary linkage;

wherein each of the primary linkages is pivotally connected to the wing, and the unsprung portion of each of the respective first and second suspension system;

wherein the wing is configured to move between the retracted position and the extended position in response to pivotally moving the primary linkage, relative to the body;

wherein each of the secondary linkages pivotally connect the wing and the body; and wherein the wing is configured to pivot, relative to the body, when the wing is in the extended position, in response to pivotally moving the secondary linkage, relative to the body.

15. The vehicle, as set forth in claim 14, wherein each of the primary linkages include a first connector and a second connector;

wherein the first connector includes a first arm and a second arm, each extending from a corner in diverging relationship to one another such that a first joint angle is defined between the first arm and the second arm;

wherein the first arm is pivotally connected to the respective first end and second end of the wing such that a first joint is defined therebetween;

wherein the corner is pivotally connected to the body at a second joint; and wherein the second connector is pivotally connected to the second arm at a third joint and the second connector is pivotally connected to the unsprung portion of the respective first and second suspension system at a fourth joint, such that a second joint angle is defined between the second arm and the second connector.

16. The vehicle, as set forth in claim 15, wherein each of the second connectors is configured to couple the wing to the unsprung portion of the respective first and second suspension system when the wing is in the extended position and the coupling assembly is coupled to the unsprung portion, such that downforce is transmitted through the primary linkage, directly to the unsprung portion of each of the first and second suspension systems, while the body is configured to be displaced relative to the wing and the unsprung portion of each of the first and second suspension systems; and wherein the second connector is configured to decouple the wing from the unsprung portion of the respective first and second suspension system when the wing is in the retracted position and the coupling assembly is decoupled from the unsprung portion, such that the downforce is not transmitted through the primary linkage, directly to the body, while the wing and the body are configured to be displaced relative to the unsprung portion of each of the first and second suspension systems.

17. The vehicle, as set forth in claim 15, wherein each of the secondary linkages include:
a secondary linkage pivotally attached to the body at a body joint and pivotally attached to the wing at a stabilizing joint; and a second actuator configured to be selectively actuated to vary a secondary distance defined between the body joint and the stabilizing joint to pivot the wing relative to at least one of the first joint and the second joint to vary the angle of incidence.

18. A vehicle configured for driving on a ground surface, the vehicle comprising:
   a body extending along a longitudinal axis, between a forward end and a rearward end, and extending along a lateral axis, generally perpendicular to the longitudinal axis, between a first lateral side and a second lateral side;
   a first and second front wheel disposed in laterally spaced relationship to one another such that the first front wheel is disposed proximate the first lateral side and the second front wheel is disposed proximate the second lateral side;
   a first and second rear wheel disposed in laterally spaced relationship to one another such that the first rear wheel is disposed proximate the first lateral side and the second rear wheel is disposed proximate the second lateral side;
   a plurality of biasing devices, wherein one of the plurality of biasing devices is operatively disposed between the body and a respective one of the first and second, front and rear wheels to allow relative motion between the body and the respective first and second front and rear wheels;
   a front and a rear aerodynamic mechanism, wherein the front aerodynamic mechanism is operatively connected to the first front and second front wheels and the body and wherein the rear aerodynamic mechanism is operatively connected to the first rear and second rear wheels and the body;
   wherein the front and the rear aerodynamic mechanisms each include:
      a wing arranged to intersect an airflow such that the airflow circulates about the wing and generates a downforce; and
      a coupling assembly operatively connected between the wing, the body, and the respective first and second, front or rear wheels;
      wherein each of the coupling assembly is configured to be selectively coupled to the respective first and second, front or rear wheels in a coupled configuration such that the downforce generated by the wing is transmitted through the coupling assembly, directly to the respective first and second, front or rear wheels; and
      wherein each of the coupling assemblies is configured to be selectively decoupled from the respective first and second, front or rear wheels, such that downforce generated by the wing is transmitted through the coupling assembly, directly to the respective first and second, front or rear wheels.

19. The vehicle, as set forth in claim 18, wherein the coupling assembly of each of the front and the rear aerodynamic mechanisms is configured to be selectively moved, relative to the body, such that the respective wing moves between an extended position and a retracted position;
   wherein when the wing is in the extended position and the coupling assembly is coupled to the respective first and second, front or rear wheels, downforce generated by the wing is transmitted through the coupling assembly, directly to the respective first and second, front or rear wheels, and wherein the body is configured to be displaced relative to the wing and the wheel; and
   wherein when the wing is in the retracted position and the coupling assembly is decoupled from the respective first and second, front or rear wheels, downforce generated by the wing is transmitted directly to the body, and wherein the wing and the body are configured to be displaced relative to the wheel.

* * * * *